United States Patent [19]
Nielsen

[11] Patent Number: 5,774,549
[45] Date of Patent: Jun. 30, 1998

[54] METHOD AND APPARATUS THAT PROCESSES A VIDEO SIGNAL TO GENERATE A RANDOM NUMBER GENERATOR SEED

[75] Inventor: Jakob Nielsen, Atherton, Calif.

[73] Assignee: Sun Microsystems, Inc., Mountain View, Calif.

[21] Appl. No.: 566,964

[22] Filed: Dec. 4, 1995

[51] Int. Cl.$^6$ ............................. H04N 7/167; H04L 9/00; H04L 9/08
[52] U.S. Cl. .............................. 380/20; 380/10; 380/21; 380/46; 380/49
[58] Field of Search .................................. 380/9, 10, 20, 380/21, 46, 49; 331/78; 364/717, 717.01, 717.02, 717.03, 717.04, 717.05, 717.06, 717.07

[56] References Cited

U.S. PATENT DOCUMENTS

| | | | |
|---|---|---|---|
| 4,484,027 | 11/1984 | Lee et al. ............................... | 380/20 X |
| 5,561,713 | 10/1996 | Suh ........................................ | 380/10 |

*Primary Examiner*—Bernarr E. Gregory
*Attorney, Agent, or Firm*—Limbach & Limbach L.L.P.

[57] ABSTRACT

A method and apparatus processes a video image signal to generate one or more random number generator seeds. Preferably, the video image signal represents a scene that is both unpredictable and "live". As a result, potential interceptors of signals encrypted with a random number sequence derived from the seed will find it difficult, if not impossible, to determine the random number sequence. To further obscure the random number sequence from potential interceptors, a seed derived by processing a first video image signal is determined and is stored. Then, a second video image signal is received and a third video image signal is received. A difference is determined between the third video image signal and the second video image signal. If the difference exceeds a threshold (indicating that the scene represented by the video image signals is "live"), then the third video image signal is processed to generate a seed. Alternately, if the difference does not exceed the threshold, then a random number generator seed derived by processing the third video image signal may be more easily determined by an interceptor. In this instance, a previously determined seed is provided as a determined seed.

18 Claims, 4 Drawing Sheets

METHOD AND APPARATUS THAT PROCESSES A VIDEO SIGNAL TO GENERATE A RANDOM NUMBER GENERATOR SEED

TECHNICAL FIELD

The present invention relates to generation of random number generator seeds and, in particular, to a method and apparatus that processes a video signal to generate a random number generator seed.

BACKGROUND

Encryption is well-known in the art. Where there is potential for a transmitted signal to be intercepted, encrypting (i.e., encoding) the signal before transmitting it reduces the chance that an interceptor can gain any useful information from the transmitted signal. For example, a user of the Internet may encrypt a signal that contains sensitive information, such as her credit card number, before transmitting the signal over the Internet.

In one prior art, an encryption "key" specifies exactly how the signal is encoded by a sender. The receiver of the signal requires the key in order to subsequently decode the signal. As long as the key remains unknown to potential interceptors, the security of the signal encoded in accordance with the key is virtually guaranteed.

Some encryption schemes utilize pre-defined keys. In order to keep the pre-defined keys unknown, they are exchanged between senders and receivers only through trusted intermediaries. Other encryption schemes utilize keys that are based on a random sequence of numbers generated by a random-number generator. The randomness of the key goes a long way towards ensuring that an interceptor cannot guess the key and use it, even if the interceptor manages to intercept the encoded signal itself.

Unfortunately, random number generators in practice consist of deterministic logic elements such as shift registers. Thus, the sequences of numbers generated by random number generators, while having good randomness properties, are in fact deterministic. That is, once the "seed" of the sequence is known, or if the seed is easily guessed, it is easy for an interceptor to predict the numbers of the random number sequence which follow. Conventionally, seeds have been computed based on information like a user's name, the time of invocation of the program, or other information that is reasonably easy for an interceptor to guess.

SUMMARY

An embodiment of the present invention is a method and apparatus that processes a video image signal to generate one or more random number generator seeds. Preferably, the video image signal represents a scene that is both unpredictable and "live", or has changed). As a result, potential interceptors of signals encrypted with a random number sequence derived from the seed will find it difficult, if not impossible, to determine the random number sequence.

In accordance with an enhanced embodiment of the invention, a seed derived by processing a first video image signal is determined and is stored. Then, a second video image signal is received and a third video image signal is received. A difference is determined between the third video image signal and the second video image signal. If the difference exceeds a threshold (indicating that the scene represented by the video image signals is "live"), then the third video image signal is processed to generate a seed. Alternately, if the difference does not exceed the threshold, then the previously determined seed is provided as a determined seed.

DETAILED DESCRIPTION OF THE INVENTION

Figure 1:
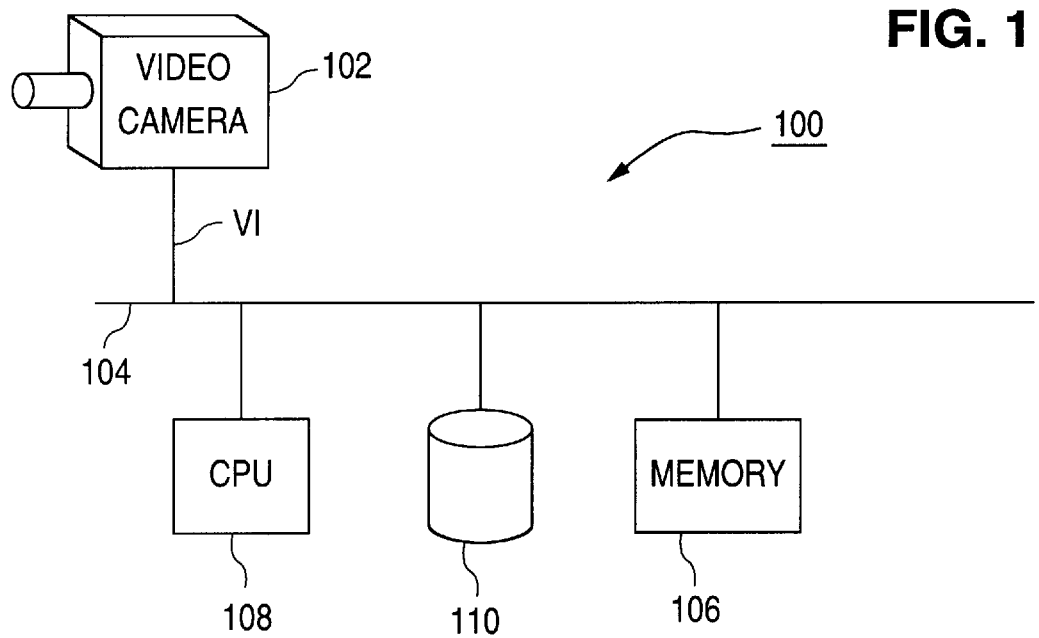
FIG. 1 is a block diagram of an apparatus in accordance with an embodiment of the invention.

Referring to FIG. 1, an apparatus 100 in accordance with an embodiment of the invention is shown in block form. A video camera 102 generates a video image signal, VI. In particular, as will be discussed in more detail below with reference to FIG. 2, the video image signal is a signal which digitally represents the visual characteristics of a scene at which the video camera is aimed. These visual characteristics may include, for example, the luminance of particular color elements of the scene. The video image signal VI is generated in frames, and the frames of the video image signal VI are transmitted for storage in a frame buffer in a memory 106, via a computer bus 104. The transmission and storage of the video image signal VI takes place under the control of a program executed by a CPU 108. The program itself may be stored on a disc storage device 110. In addition (or alternatively), the memory 106 may include read-only memory, optical memory, or other forms of memory in which the program, or parameters used by the program, are prestored.

Each frame of the video image signal VI is a digital representation of the scene in a snapshot of time. Throughout this disclosure, the various frames of the video image signal are differentiated by their subscript (i.e., $VI_i$).

Many computer workstations in use today include video cameras for video telephony or other applications. This is significant because such workstations provide users with all of the hardware necessary to practice the invention. Of course, those users would have to acquire the proper software. In addition, if a particular computer workstation does not already include the video camera, then some other video source can be provided instead, as long as the video image signal provided by the source is unpredictable. For example, a video signal feed from a public carrier news source would not be a desirable video image signal source because it is publicly available and, as such, interceptors have easy access to it. By contrast, a video signal feed from a localized security camera may provide a desirable video image signal, VI.

Figure 2:
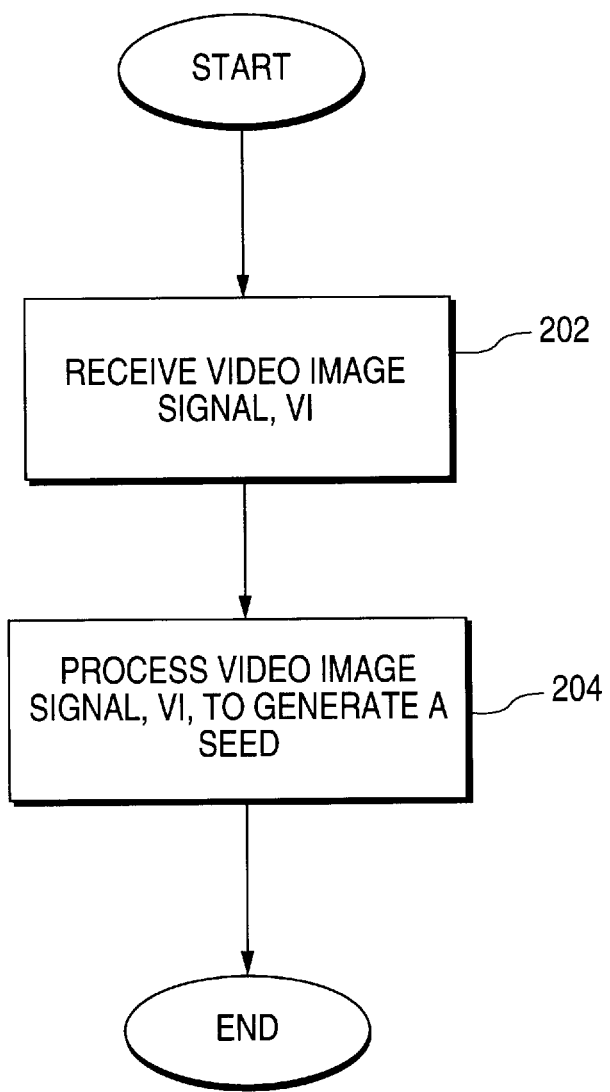
FIG. 2 is a flowchart that illustrates a method in accordance with an embodiment of the invention.

Referring now to the flowchart shown in FIG. 2, the invention is shown in its basic form. In particular, from whatever source the video image signal is provided, the CPU 108 receives the video image signal, VI, (step 202) and processes the video image signal to generate a random number generator seed (step 204).

Figure 3:
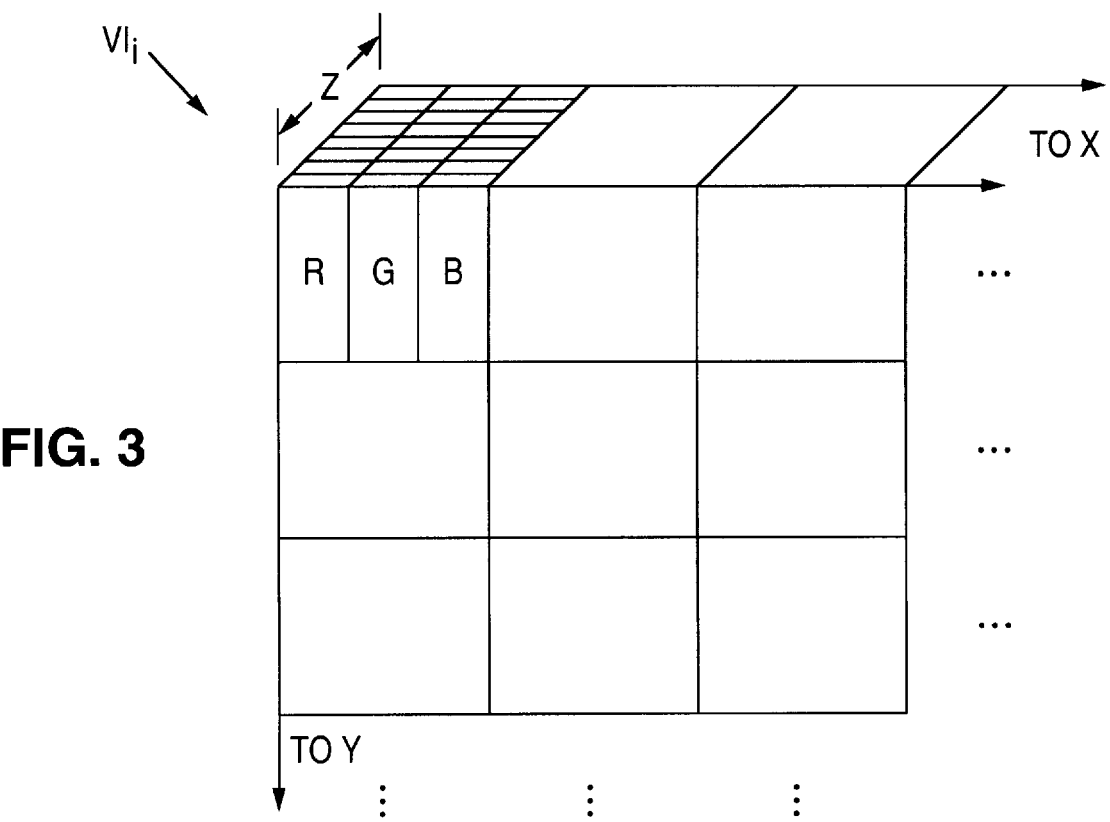
FIG. 3 illustrates an example video image signal format.

One possible format of the video image signal, VI, is now described with reference to FIG. 3. As discussed above, each frame $VI_i$ of the video image signal VI is a digital representation of a scene in a snapshot of time. For example, as shown in FIG. 3, a frame $VI_i$ of the video image signal VI may be a signal which represents a rectangular image of "x" pixels by "y" pixels, with "z" bits of depth to represent each of the color components (Red, Green, and Blue) of each pixel. A high-quality video camera might generate frames that represent rectangular images of 640 by 480 pixels (i.e., x=640 and y=480), with 8 bits to represent each of the red, blue and green color components of each pixel (i.e., z=8). A preferred embodiment of the invention processes only the least significant bit of each color component to generate the random number generator seed. In other words, such a preferred embodiment operates without regard to the depth of the color component representation and, in particular, even a video image generated by a black-and-white video camera (that is, having z=1 and, being monochrome, only one "color" component) can be processed in accordance with such an embodiment to generate the random number generator seed.

Figure 4:
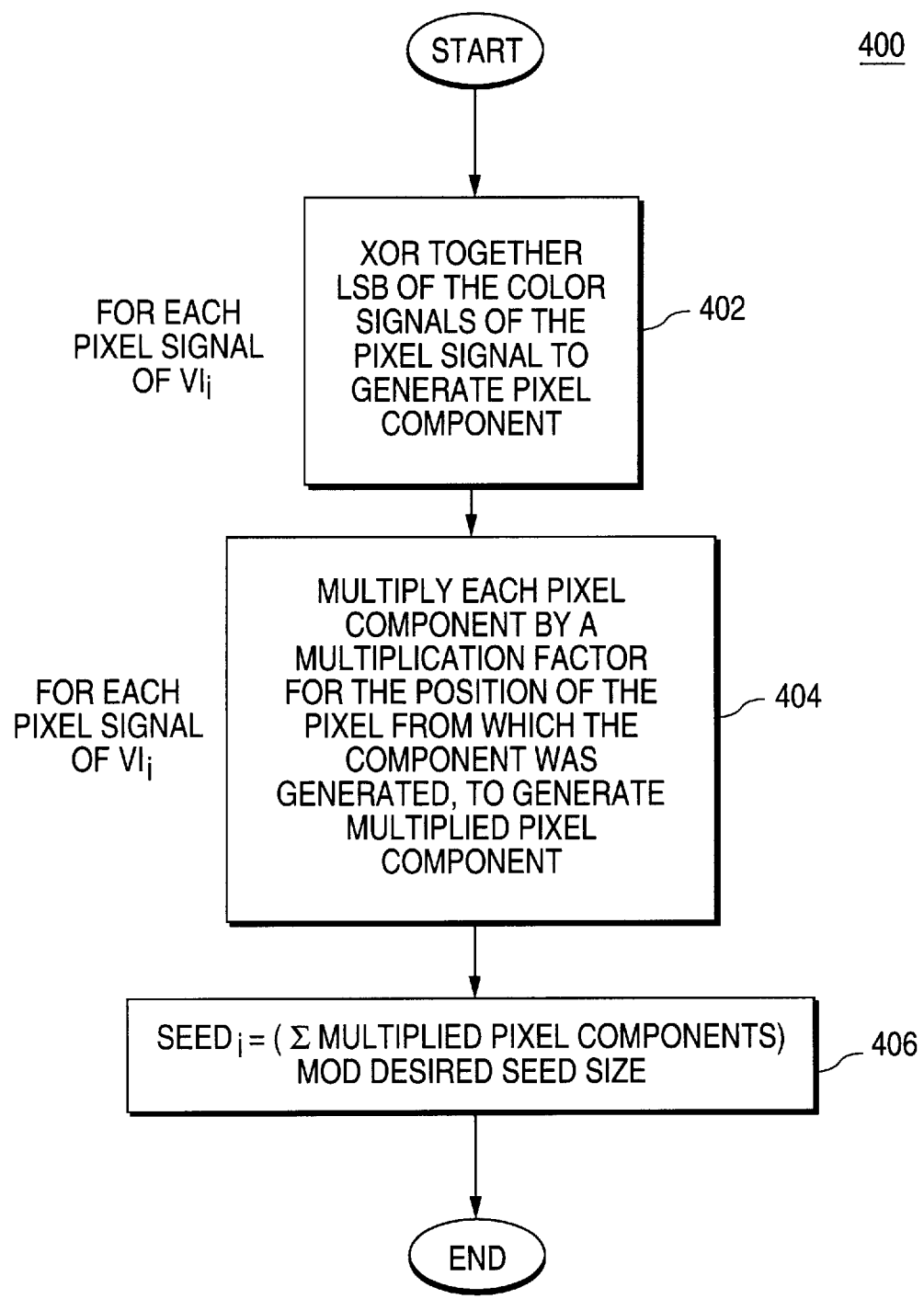
FIG. 4 is a flowchart that shows steps the CPU (FIG. 1), under control of a program, may execute to process a video image signal in accordance with an embodiment of the invention.

FIG. 4 is a flowchart 400 which shows steps that the CPU 108 may execute to process the video image signal under control of the program. First, at step 402, for each pixel the CPU XOR's together the least significant bit of each color component signal of that pixel to generate a pixel component. Then, to enhance the randomness of the resultant seed, for each pixel component, at step 404 the CPU multiplies the pixel component by a multiplication factor whose value depends on the position in the video image signal of the pixel, from which the pixel component was generated. For example, a table of multiplier values as shown below may be employed:

ROW 1: 1, 2, 4, 8, 16, 32, 64, 128, 256, 512, 1024, 1, 2, 4, 8, . . .
ROW 2: 2, 4, 8, 16, 32, 64, 128, 256, 512, 1024, 1, 2, 4, 8, 16, . . .
ROW 3: 4, 8, 16, 32, 64, 128, 256, 512, 1024, 1, 2, 4, 8, 16, 32, . . .

Finally, to generate the seed at step 406, the CPU adds together the products which result from step 404 and truncates the resultant sum to the desired size of the seed.

The seed cannot be guessed by outside parties because it depends on the video image signal VI, and the video image signal VI is representative of the scene registered by the video camera 102. For example, if the video camera 102 is located in an office, the video image signal VI may vary with the facial expression of a person within the scene registered by the video camera 102, shadows cast by incoming sunlight, lights from a corridor whose illumination of the scene depends on the width of the office door, and a myriad of other factors.

Preferably, a seed is generated and provided only when the scene represented by the video image VI is "live". For example, during off hours when a user's office in which the video camera 102 may be vacant, the user might access the computer from a remote location (e.g., from home via a modem). In such an instance, the video image signal VI would not change sufficiently from frame to frame to provide a succession of unpredictable random number generator seeds. In accordance with the embodiment 500 of the invention shown in the flowchart of FIG. 5, random number generator seeds are generated and saved while the scene is live, and these saved seeds are available for later use when requested.

Figure 5:
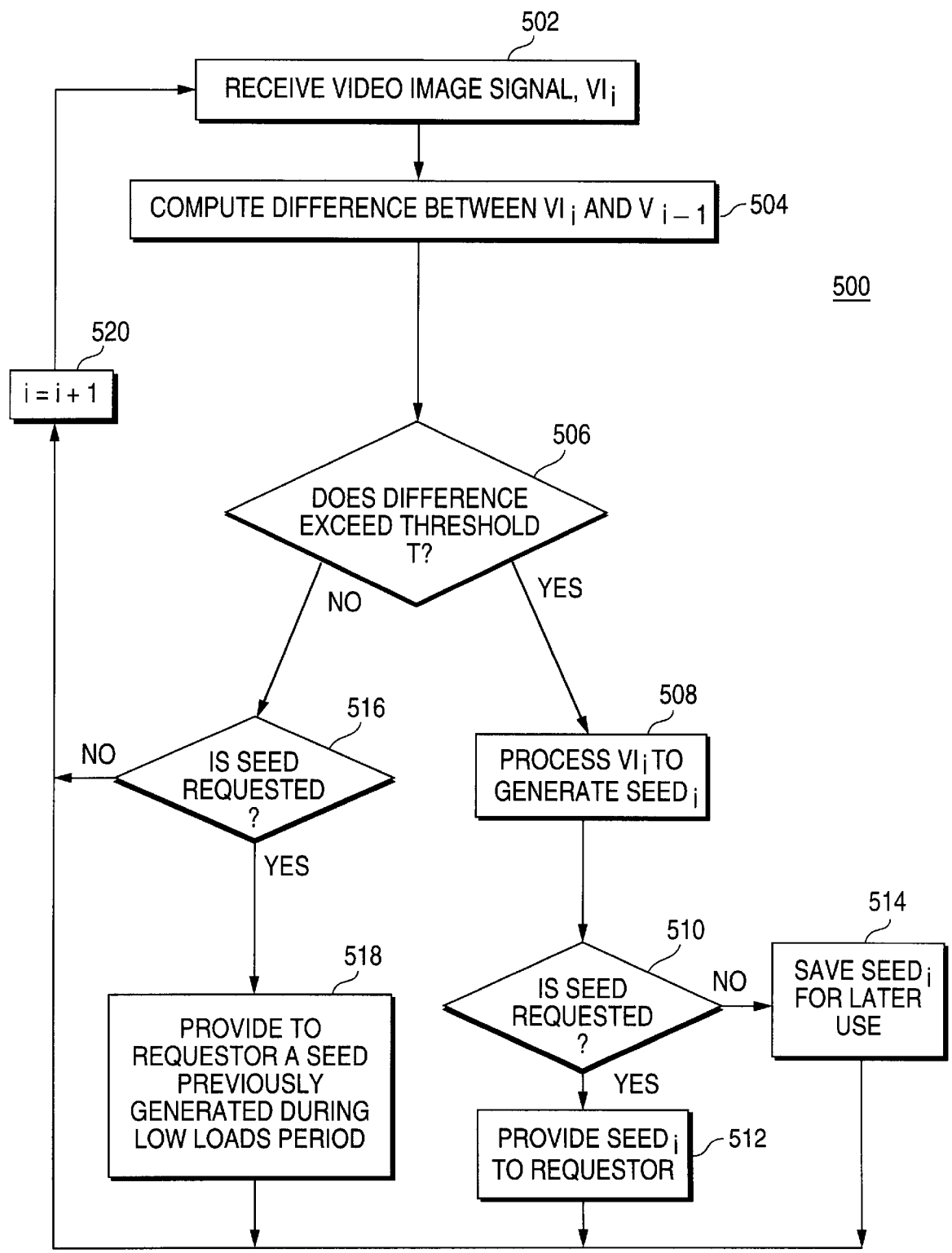
FIG. 5 is a flowchart that shows steps the CPU may execute to generate a number of random seeds while a scene represented by a video image signal is "live" and by which these seeds are saved for later use when requested.

With specific reference to FIG. 5, the CPU 108 receives a current video image signal frame $VI_i$ at step 502. At step 504, the CPU 108 computes the difference between the current video image signal $VI_i$ and a previously received video image signal frame $VI_{i-1}$. If the difference between the current video image signal frame $VI_i$ and the previously received video image signal frame $VI_{i-1}$ exceeds a threshold value T (which may be, for example, one of the program parameters stored in the ROM 112), then the CPU 108 continues execution of the program at step 508, where the CPU processes the current video image signal frame $VI_i$ to generate a seed, $SEED_i$.

One way to determine the difference between the current video image signal $VI_i$ and the previously received video image signal $VI_{i-1}$ is to compare the image signals on a pixel-by-pixel basis. That is, for each pixel in the current video image signal $VI_i$, the difference is computed between that pixel and the corresponding pixel in the previously received video image signal $VI_{i-1}$. Then, the absolute values of these differences for all the pixels are summed together and compared to the threshold value T.

Another way to determine the difference between the current video image signal $VI_i$ and the previously received video image signal $VI_{i-1}$ is to compare the image signals on a sliding-area basis. For example, if a sliding area is determined to be 3×3 pixels, then for the first 3×3 pixel area in the current video image signal $VI_i$, the values of the pixels are averaged. Then, for the previously received video image signal, the values of the pixels in the corresponding 3×3 pixel area are averaged. The difference is determined between the two averages. Then, the 3×3 pixel area is "slid" one pixel at a time, first over, and then down, and the averaging and differencing operation is repeated for each new 3×3 pixel area. Finally, when the averaging and differencing operation has been performed on all the 3×3 pixel areas in the image signals, the absolute value of the differences for all the areas are summed together and compared to the threshold value T.

The threshold value T can be established automatically for the particular video image source by calibrating to a scene which is known to be not "live".

At step 510, the CPU 108 determines if a seed is being requested. For example, the CPU 108 may be executing the seed generation program as a background process, and the CPU 108 may be executing an encryption program, that utilizes the generated seeds, as a foreground process. If the CPU 108 determines at step 510 that a seed is being requested, it provides the just-generated seed $SEED_i$ to the requestor at step 512. Otherwise, the CPU 108 continues execution at step 514 where the just-generated seed $SEED_i$ is saved for later use.

If at step 506 the CPU 108 determines that the difference between the current video image signal frame $VI_i$ and the previously received video image signal frame $VI_{i-1}$ does not exceed the threshold value T, then the CPU 108 continues execution at step 516 where it determines if a seed is being requested. If the CPU 108 determines at step 516 that a seed is being requested then at step 518 the CPU 108 provides to the requester a previously generated seed that the CPU 108 has saved at step 514.

Finally, before the CPU 108 receives a next video image signal frame at step 502, the CPU 108 at step 520 increments the index "i".

It should be noted that the rate of seed generation by the CPU 108 is limited by the rate at which video signals VI can be provided to the CPU 108. For example, this rate may depend on the scan rate of the video camera 102. However, if the foreground process (e.g., encryption process) being executed by the CPU 108 requests seeds faster than they can be provided by the background process, the background process can provide previously generated seeds.

It should be understood that various alternatives to the embodiments of the invention described herein may be employed in practicing the invention. It is intended that the following claims define the scope of the invention and that methods and apparatus within the scope of these claims and their equivalents be covered thereby.

What is claimed is:

1. A method, executed in a computer system, for determining a seed for use in encrypting a digital signal, comprising the steps of:

receiving a video image signal that includes a video image;

processing the video image to generate a seed; and providing the generated seed as the determined seed wherein the video image signal that includes a video image is a first video image signal that includes a first video image, and further comprising the steps of:

storing the determined seed as a previously determined seed;

receiving a second video image signal that includes a second video image;

receiving a third video image signal that includes a third video image;

determining a difference between the third video image and the second video image; and processing the third video image to generate a seed only if the difference between the third video image and the second video image exceeds a threshold.

2. The method of claim 1, and further comprising the step of:

providing the previously determined seed as the determined seed if the difference between the third video image and the second video image does not exceed the threshold.

3. A method executed in a computer system, for determining a seed for use in encrypting a digital signal, comprising the steps of:

receiving a video image signal that includes a video image;

processing the video image to generate a seed; and providing the generated seed as the determined seed, wherein the video image includes a plurality of pixel signals, each pixel signal including at least one color signal, wherein the processing step comprises:

for each pixel signal, logically combining the color signals of that pixel to generate a pixel component for that pixel signal;

generating the seed based on the generated pixel components.

4. The method of claim 3, wherein the color signals of the pixel signals each have a plurality of bits, and wherein the step of logically combining the color signals for each pixel signal includes XOR'ing together a least significant bit of each color signal.

5. The method of claim 3, wherein each pixel signal is associated with a different position in the video signal and wherein the processing step further comprises:

providing a multiplication factor for each different position in the video signal; and for each generated pixel component, multiplying that generated pixel component by the multiplication factor provided for the position in the video signal of the pixel from which that pixel component was generated, to produce a multiplied generated pixel component, wherein the step of generating the seed based on the generated pixel components includes generating the seed based on the multiplied generated pixel components generated from the pixel components.

6. The method of claim 5, wherein the step of generating the seed based on the multiplied pixel components includes:

adding together the multiplied generated pixel components to generate a sum of multiplied generated pixel components; and performing a modulus operation on the sum with a desired seed size to generate the seed.

7. An article of manufacture comprising:

a computer usable medium having computer readable program code embodied therein that causes a computer to determine a seed for use in encrypting a digital signal, the computer readable program code in said article of manufacture comprising:

computer readable program code that causes the computer to receive a video image signal that includes a video image;

computer readable program code that causes the computer to process the video image to generate a seed; and computer readable program code that causes the computer to provide the generated seed as the determined seed, wherein the video image is a first video image, and wherein the computer readable program code further comprises:

computer readable program code that causes the computer to store the determined seed as a previously determined seed;

computer readable program code that causes the computer to receive a second video image signal that includes a second video image;

computer readable program code that causes the computer to receive a third video image signal that includes a third video image;

computer readable program code that causes the computer to determine a difference between the third video image and the second video image; and computer readable program code that causes the computer to process the third video image to generate a seed only if the difference between the third video image and the second video image exceeds a threshold.

8. The article of manufacture of claim 7, wherein the computer readable program code further comprises:

computer readable program code that causes the computer to provide the previously determined seed as the determined seed if the difference between the second video image and the first video image does not exceed the threshold.

9. An article of manufacture comprising:

a computer usable medium having computer readable program code embodied therein that causes a computer to determine a seed for use in encrypting a digital signal, the computer readable program code in said article of manufacture comprising:

computer readable program code that causes the computer to receive a video image signal that includes a video image;

computer readable program code that causes the computer to process the video image to generate a seed; and computer readable program code that causes the computer to provide the generated seed as the determined seed, wherein the video image signal includes a plurality of pixel signals, each pixel signal including at least one color signal, wherein the computer readable program code that causes the computer to process the video signal to generate the seed comprises:

computer readable program code that causes the computer, for each pixel signal, to logically combine the color signals of that pixel to generate a pixel component for that pixel signal;

computer readable program code that causes the computer to generate the seed based on the generated pixel components.

10. The article of manufacture of claim 9, wherein the color signals of the pixel signals each have a plurality of bits, and wherein the computer readable program code that causes the computer to logically combine the color signals for each pixel signal includes computer readable program code that causes the computer to XOR together a least significant bit of each color signal.

11. The article of manufacture of claim 9, wherein each pixel signal is associated with a different position in the video signal, and the computer readable program code further comprises:

computer readable program code that causes the computer to provide a multiplication factor for each different position in the video signal; and computer readable program code that causes the computer, for each generated pixel component, to multiply that generated pixel component by the multiplication factor provided for the position in the video signal of the pixel from which that pixel component was generated, to produce a multiplied generated pixel component, and the computer readable program code that causes the computer to generate the seed based on the generated pixel components includes computer readable program code that causes the computer to generate the seed based on the multiplied generated pixel components generated from the pixel components.

12. The article of manufacture of claim 11, wherein the computer readable program code that causes the computer to generate the seed based on the multiplied pixel components includes computer readable program code that causes the computer to add together the multiplied generated pixel components to generate a sum of multiplied generated pixel components; and computer readable program code that causes the computer to perform a modulus operation on the sum with a desired seed size to generate the seed.

13. A system that determines a seed for use in encrypting a digital signal, comprising:

video imaging receiving circuitry that receives a video image signal that includes a video image;

a processor; and a computer usable medium having computer readable program code embodied therein, the computer readable program code comprising:

computer readable program code that controls the processor to cause the video image receiving circuitry to receive the video image;

computer readable program code that controls the processor to process the video image to generate a seed; and computer readable program code that controls the processor to provide the generated seed as the determined seed, wherein the video image signal is a first video image signal, and wherein the computer readable program code further comprises:

computer readable program code that controls the processor to store the determined seed as a previously determined seed;

computer readable program code that controls the video image receiving circuitry to receive a second video image signal that includes a second video image;

computer readable program code that controls the video image receiving circuitry to receive a third video image signal that includes a third video image;

computer readable program code that controls the processor to determine a difference between the third video image and the second video image; and computer readable program code that controls the processor to process the third video image to generate a seed only if the difference between the third video image and the second video image exceeds a threshold.

14. The system of claim 13, wherein the computer readable program code further comprises:

computer readable program code that controls the processor to provide the previously determined seed as the determined seed if the difference between the third video image and the second video image does not exceed the threshold.

15. A system that determines a seed for use in encrypting a digital signal, comprising:

video imaging receiving circuitry that receives a video image signal that includes a video image;

a processor; and a computer usable medium having computer readable program code embodied therein, the computer readable program code comprising:

computer readable program code that controls the processor to cause the video image receiving circuitry to receive the video image;

computer readable program code that controls the processor to process the video image to generate a seed; and computer readable program code that controls the processor to provide the generated seed as the determined seed, wherein the video image signal includes a plurality of pixel signals, each pixel signal including at least one color signal, wherein the computer readable program code that controls the processor to process the video signal to generate the seed comprises:

computer readable program code that controls the processor, for each pixel signal, to logically combine the color signals of that pixel to generate a pixel component for that pixel signal;

computer readable program code that controls the processor to generate the seed based on the generated pixel components.

16. The system of claim 15, wherein the color signals of the pixel signals each have a plurality of bits, and wherein the computer readable program code that controls the processor to logically combine the color signals for each pixel signal includes computer readable program code that controls the processor to XOR together a least significant bit of each color signal.

17. The system of claim 15, wherein each pixel signal is associated with a different position in the video signal, and the computer readable program code further comprises:

computer readable program code that controls the processor to provide a multiplication factor for each different position in the video signal; and computer readable program code that controls the processor, for each generated pixel component, to multiply that generated pixel component by the multiplication factor provided for the position in the video signal of the pixel from which that pixel component was generated, to produce a multiplied generated pixel component, and wherein the computer readable program code that controls the processor to generate the seed based on the generated pixel components includes computer readable program code that controls the processor to generate the seed based on the multiplied generated pixel components generated from the pixel components.

18. The system of claim 17, wherein the computer readable program code that controls the processor to generate the seed based on the multiplied pixel components includes computer readable program code that controls the processor to add together the multiplied generated pixel components to generate a sum of multiplied generated pixel components; and computer readable program code that controls the processor to perform a modulus operation on the sum with a desired seed size to generate the seed.

* * * * *